UNITED STATES PATENT OFFICE.

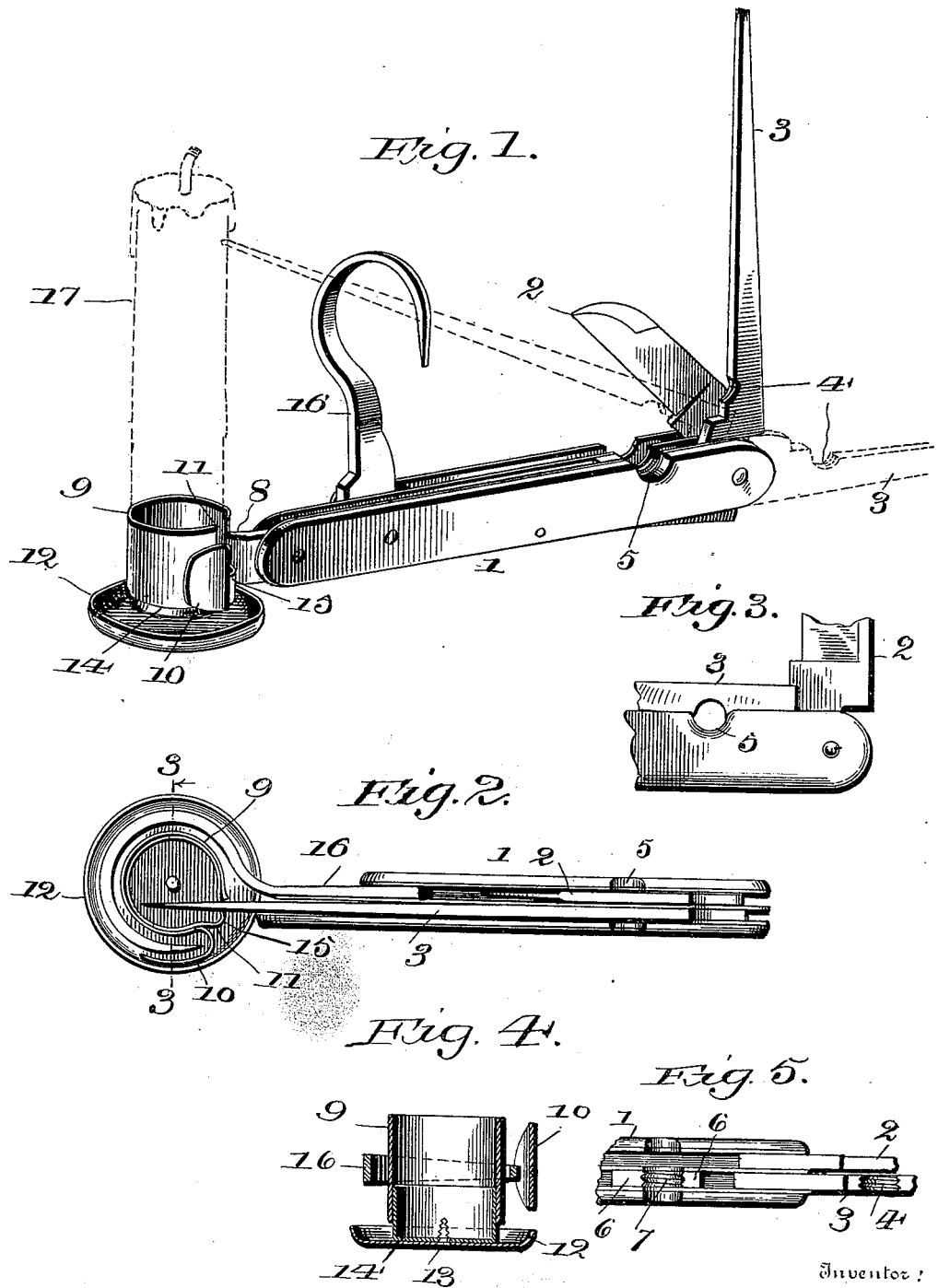

JACOB FRANK LAYES, OF LENVILLE, IDAHO.

COMBINED MINER'S CANDLESTICK AND FUSE IMPLEMENT.

SPECIFICATION forming part of Letters Patent No. 619,765, dated February 21, 1899.

Application filed July 7, 1898. Serial No. 685,339. (No model.)

*To all whom it may concern:*

Be it known that I, JACOB FRANK LAYES, a citizen of the United States, residing at Lenville, in the county of Latah and State of Idaho, have invented certain new and useful Improvements in a Combined Miner's Candlestick and Fuse Implement; and I do hereby declare the following to be a full, clear, and exact description of the invention, such as will enable others skilled in the art to which it appertains to make and use the same.

My invention has relation to a combined miner's candlestick and fuse implement; and it consists in the novel construction and arrangement of its parts, as hereinafter described.

The object of my invention is to provide a device of the nature as stated, said device adapted to be folded up and to be easily carried in the pocket of the miner. It is provided with a means for holding a candle and a detachable cup adapted to catch the grease from the candle. It is also provided with a sharpened spike adapted to be stuck in crevices and when not in use adapted to be closed, the point of the spike being housed within the candle-holder.

The device is also provided with a hook, by means of which the implement is supported when it is not convenient to use the spike. The hook is also adapted to be closed, and when closed passes around the candle-holder, the end of the hook being housed by a flange of the candle-holder.

The implement is also provided with a knife-blade, with which the fuse may be cut and trimmed. The spike is provided with a recess having threads cut therein and is adapted to register with a block located in the interior of the handle of the implement. The said recesses are adapted to receive a cap, and the implement may thus be used as a cap-tightener.

In the accompanying drawings, Figure 1 is a perspective view of the implement, showing a candle in dotted lines located in the holder. Fig. 2 is a top plan view of the implement with all of the parts closed. Fig. 3 is a side elevation of one end of the implement, showing the recess of the spike in conjunction with the recess of the block of the handle. Fig. 4 is a transverse sectional view of the candle-holder cut on the line 3 3 of Fig. 2; and Fig. 5 is a top plan view of the end of the handle of the implement, showing the block with the threaded recess.

The handle 1 is made in the shape of an ordinary knife-handle. The blade 2 is pivoted in the ordinary manner in the handle. The spike 3 is also pivoted at its end in the handle, the outer end of said spike being sharpened, as shown in Fig. 2. The spike is provided in its inner end and on its lower edge with a recess 4, said recess having a threaded surface.

In the vicinity of the end of the handle to which the blade 2 and the spike 3 are attached the upper edge of the handle is provided with a transversely-extending recess 5. In the interior of the handle a block 6 is located, said block having in its upper surface a recess 7, the said recess 7 registering with the recess 5 of the handle. The recess 7 is provided with a threaded surface, as shown in Fig. 5. When the spike 3 is closed, the recesses 4 and 7 register with each other, as indicated in Fig. 3.

At the opposite end of the handle 1 the fixed candle-holder 8 is secured. The candle-holder consists of the cylindrical portion 9, the end of the said portion being bent back and forming the flange 10 and leaving an opening 11. A removable drip-cup 12 is adapted to be attached to the lower end of the cylindrical portion 9. The cup 12 is provided at its center with a screw 13, the said screw being adapted to pass through a threaded perforation in the bottom of the central sleeve 14. The said sleeve is provided in its side with the eccentrically-extending section 15, the said section being adapted to slip in the opening 11 of the cylindrical portion 9, as shown in Fig. 2, and thus when the sleeve 14 is slipped in the lower end of the portion 9, as shown in Fig. 4, the drip-cup 12 may be unscrewed and detached from the sleeve 14, as the eccentrically-extending section 15, acting in conjunction with the edges of the opening 11, prevents the sleeve 14 from revolving. When the spike 3 is closed, the point of the spike passes through the opening 11, and the point of the spike is housed within the cylindrical portion 9 of the candle-holder, as shown in Fig. 2.

At an intermediate point of the handle 1 and in the vicinity of the end provided with the candle-holder the hook 16 is pivotally attached. The said hook 16 when closed is adapted to pass around the cylindrical portion 9 of the holder, and the point of the hook is housed under the flange 10, as shown in Fig. 2. When the hook 16 is swung up in the position shown in Fig. 1, the said hook may be engaged on any suitable projection or may be passed over a nail, and thus the implement will be supported. It will thus be seen that two means of support for the implement are provided—namely, the spike 3 and the hook 16. Either one of these means may be used, at the option of the miner, or one may be used where it is impossible to use the other.

The candle, as indicated by dotted lines 17 in Fig. 1, is slipped at its lower end in the cylindrical portion 9 of the candle-holder.

The implement is suitably secured to the wall of the mine or other place, and the drippings from the candle will be retained within the dripping-cup 12. Furthermore, should it be desirable to place the implement on the ground the broad bottom of the dripping-cup 12 will prevent the implement and the candle from tipping over laterally.

When the device is not in use, the candle 17 is removed and all of the pivoted parts are closed down, the dripping-cup 12 is unscrewed, and thus the implement is in compact form and may be readily carried by the miner.

As above stated, the knife-blade 2 may be used for cutting fuses, and by placing the cap (such as is used by miners) between the threaded surfaces of the recess 4 of the block 3 and the recess 7 of the block 6 and by closing the said spike 3 down the cap is firmly held in a clamp or vise, and it may be tightened or otherwise manipulated as the occasion may require.

Having described my invention, what I claim as new, and desire to secure by Letters Patent, is—

1. An implement of the nature as described, consisting of a handle, a spike pivotally attached to the handle, a candle-holder located at the opposite end of the handle, said candle-holder having a cylindrical portion adapted to receive the lower end of the candle, said cylindrical portion having in its side a recess, the end of the spike adapted to pass through said recess when the spike is closed.

2. An implement of the nature as described, consisting of a handle, a hook having a pointed end, said hook being pivotally attached to the handle, a candle-holder fixed to the handle, said candle-holder having a cylindrical portion, a flange extending out from the cylindrical portion, said hook when closed, adapted to pass around the cylindrical portion, the end of the hook being housed under the flange.

3. An implement of the nature as described, consisting of a handle, a suitable means for supporting the handle, a candle-holder attached to the handle, said candle-holder having a cylindrical portion adapted to receive the lower end of the candle, said cylindrical portion having in its side a recess, a sleeve adapted to slip in the lower end of the cylindrical portion, said sleeve having in its side an eccentrically-extending section, said section adapted to enter the recess of the cylindrical portion, a removable drip-cup attached by means of a screw to the bottom of the sleeve.

In testimony whereof I affix my signature in presence of two witnesses.

JACOB FRANK LAYES.

Witnesses:
R. J. MOURINY,
PAUL LEUSCHEL.